(12) United States Patent
Aiyer et al.

(10) Patent No.: US 8,326,807 B2
(45) Date of Patent: Dec. 4, 2012

(54) METHODS OF MEASURING CONSISTABILITY OF A DISTRIBUTED STORAGE SYSTEM

(75) Inventors: Amitanand Aiyer, Austin, TX (US);
Eric A. Anderson, Palo Alto, CA (US);
Xiaozhou Li, Cupertino, CA (US);
Mehul A. Shah, Saratoga, CA (US);
John Johnson Wylie, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 12/359,190

(22) Filed: Jan. 23, 2009

(65) Prior Publication Data
US 2010/0192018 A1 Jul. 29, 2010

(51) Int. Cl.
*G06F 17/30* (2006.01)
(52) U.S. Cl. ..................... 707/690
(58) Field of Classification Search ............ 707/690
See application file for complete search history.

(56) References Cited

U.S. PATENT DOCUMENTS

| | | | | |
|---|---|---|---|---|
| 5,175,866 | A * | 12/1992 | Childress et al. | 455/8 |
| 6,556,924 | B1 * | 4/2003 | Kariyawasam et al. | 702/34 |
| 2004/0088142 | A1 * | 5/2004 | Ashley et al. | 702/184 |

OTHER PUBLICATIONS

Nikoladis et al., Comparison of Probability and Possibility for Design Against Catastropphic Failure Under Uncertainty, 2004.*
Thambidurai et al., Interactive Consistency With Multiple Failure Modes, 1998.*
Hiltunen, Matti A. et al., Adaptive Distributed and Fault-Tolerant Systems. Department of Computer Science, University of Arizona, Tucson, AZ 85721, USA. Jun. 9, 1995.
Krishnakumar, Narayanan, et al., Bounded Ignorance in Replicated Systems, Department of Computer Science, SUNY at Stony Brook, Stony Brook, NY 11794-4400. 1991.
Lamport, Leslie, Checking a Multithreaded Algorithm with +CAL, Microsoft Research.Springer-Verlag Berlin Hedelberg. 2006.
Davidson, Susan B., et al., Consistency in Partitioned Networks, Computing Surveys, vol. 17, No. 3, Sep. 1985.
Yu, Haifeng, et al., Design and Evaluation of a Conit-Based Continuous Consistency Model for Replicated Services, Duke University, ACM Transactions on Computer Systems, vol. 20, No. 3, pp. 239-282, Aug. 2002.
DeCandia, Giuseppe, et al., Dynamo: Amazon's Highly Available Key-value Store, Amazon.com, pp. 205-220, Oct. 2007.
Meyer, John F., On Evaluating the Performability of Degradable Computing Systems, IEEE Transactions on Computers, vol. c-2, No. 8, Aug. 1980.
Lamport, Leslie, On interprocess communication Part I Basic formalism, Digital Equipment Corporations Systems Research Center, Palo Alto, California 94301, Spinger-Verlag 1986.
Aiyer, Anitanand, et al., On the Availability of Non-strict Quorum Systems, Department of Computer Sciences, The University of Texas at Austin, 2005.

(Continued)

*Primary Examiner* — William Spieler

(57) ABSTRACT

A method for measuring consistability of a distributed storage system is disclosed. The method includes determining at least one consistency level that the distributed storage system can provide. A plurality of failure classes can be determined for the distributed storage system. A probability of the distributed storage system to be in each of the plurality of failure classes can be measured. Each failure class can be mapped to the at least one consistency level. The probability of each failure class for each consistency level can be summed to determine an expected portion of time that the distributed storage system provides each consistency level.

20 Claims, 2 Drawing Sheets

OTHER PUBLICATIONS

Pleisch, Stefan, et al., On the Specification of Partitionable Group Membership, Seventh European Dependable Computing Conference, IEEE Computer Society, 978-0-7695-3138-0008, 2008.

Saito, Yasushi, et al., Optimistic Replication, ACM Computing Surveys, vol. 37, No. 1, pp. 42-81, Mar. 2005.

Belaramani, Nalini, et al., PRACTI Replication, USENIX Association NSDI '06: 3rd Symposium on Networked Systems Design & Implementation, 2006.

Malkhi, Dahlia, et al., Probabilistic Quorum Systems, Information and Computation 170, 184-206 2001.

Lee, Hyunyoung, et al., Randomized registers and iterative algorithms, Distrib. Comput. 2005.

Lamport, Leslie, Specifying Systems the TLA+ Language and Tools for Hardware and Software Engineers, Addison-Wesley, Jun. 2002. pp. 1-100.

Lam Port, Leslie, Specifying Systems the TLA+ Language and Tools for Hardware and Software Engineers, Addison-Wesley, Jun. 2002. pp. 101-200.

Lamport, Leslie, Specifying Systems the TLA+ Language and Tools for Hardware and Software Engineers, Addison-Wesley, Jun. 2002. pp. 201-300.

Lamport, Leslie, Specifying Systems the TLA+ Language and Tools for Hardware and Software Engineers, Addison-Wesley, Jun. 2002. pp. 301-364.

Hiltunen, Matti A., et al., Supporting Customized Failure Models for Distributed Software, Department of Computer Science, University of Arizona, Tucson, AZ 85721, 1999.

Babaoglu, Ozalp, et al., System Support for Partition-Aware Network Applications, Department of Computer Science, University of Bologna, Italy, Jan. 1, 1998.

Gilbert et al., Brewer's Conjecture and the Feasibility of Consistent, Available, Partition-Tolerant Web Services, Massachusetts Institute of Technology, Cambridge MA.

Raynal et al., Merging Atomic Consistency and Sequential Consistency, IRISA, Campus Universitaire de Beaulieu, Rennes Cedex, France, Publication Interne No. 1629.

Aiyer et al., Consistability: Describing Usually Consistent Systems, Published in proceedings of HotDep 2008, 4th workshop, Dec. 7, 2008, San Diego, CA.

* cited by examiner

METHODS OF MEASURING CONSISTABILITY OF A DISTRIBUTED STORAGE SYSTEM

BACKGROUND

There is a general trend to provide computer processing and storage services over the internet. For example, most people have internet email accounts in which several gigabytes of space are available for storage of sent and received emails. There are also several popular public internet sites at which a user can store and view their photographs. In addition, common software applications such as word processors, which were once available only on a desktop or local area network, are now available for use over the internet. Moreover, conducting business transactions and e-commerce over the internet is now commonplace.

The computer processing and storage requirements that enable these programs to be used are typically provided by large groups of servers. Thousands of servers can be located in a single location, or linked together at multiple locations to provide desired storage and processing services. Providing the servers needed to offer digital storage or operate software on a website can be a business itself. As businesses and society becomes more dependent on remote digital storage and processing, there is a need to classify the performance of a particular digital storage or processing scheme.

For example, a large internet business can operate a website using a group of servers, typically called a server farm or server cluster, which is guaranteed to be functioning 99.99% of the time. In order to provide this level of operability, the servers typically have multiple levels of backup, and are usually distributed to two or more geographic locations. The service provider that operates the server farm typically charges extra for the high level of reliability to compensate for the extra hardware requirements that provide the needed dependability.

However, the metrics used to measure the reliability of a group of servers are not sufficient to enable an internet business to accurately gauge different types of systems. This limits the internet businesses' ability to purchase desired services in a cost effective manner. The lack of metrics also reduces a service provider's ability to offer competitive pricing of digital storage and processing services.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
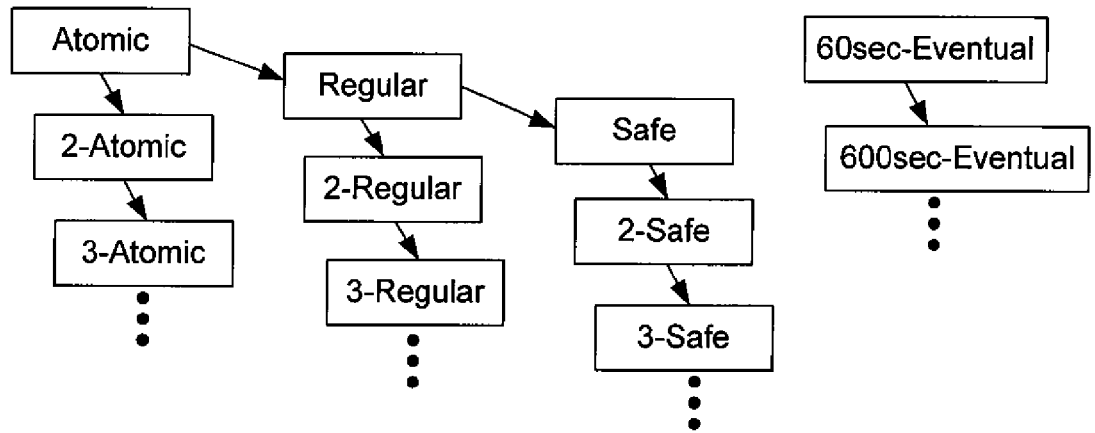
FIG. 1 is an illustration of a lattice of consistency classes in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

One technique of determining the reliability of a computer system comprised of a network containing a plurality of servers is by measuring a set of properties, such as the computer system's Atomicity, Consistency, Isolation, and Durability (ACID). These properties can help to ensure that database transactions are processed and stored reliably on a network comprising a plurality of interconnected servers. In the context of databases, a single logical operation on the data is called a transaction.

An example of a transaction is the uploading of a picture to a storage site. The actual transaction may consist of multiple individual operations. For example, when a picture is uploaded, the file can be stored on a first server. A smaller copy of the picture may be created and stored for display on a website. The original picture file, or a portion of the original file, can then be copied to multiple servers located at different geographic locations.

Atomicity refers to the ability of a database management system to guarantee that either all of the tasks of a transaction are performed or none of them are. For example, the transfer of funds from one account to another can be completed or it can fail for a multitude of reasons, but atomicity guarantees that one account won't be debited if the other is not credited. Atomicity states that database modifications must follow an "all or nothing" rule. Each transaction is said to be "atomic." If one part of the transaction fails, the entire transaction fails. It is critical that the database management system maintain the atomic nature of transactions in spite of any database management system, operating system or hardware failure. Atomicity is obtained when an attribute can no longer be broken down any further.

The consistency property ensures that the database remains in a consistent state before the start of the transaction and after the transaction is over, whether the transaction is successful or not. Consistency states that only valid data will be written to the database. When data is written to the database, it is referred to as a "put". When data is accessed from the database, it is called a "get".

If, for some reason, a transaction is executed that violates the database's consistency rules, the entire transaction can be rolled back and the database can be restored to a state consistent with those rules. On the other hand, if a transaction successfully executes, the database can move from one state that is consistent with the rules to another state that is also consistent with the rules.

Isolation refers to a requirement that other operations cannot access or see the data in an intermediate state during a transaction. This constraint is typically used to maintain the performance as well as the consistency between transactions in a database management system.

Durability refers to the guarantee that once the user has been notified of success, the transaction will persist, and not be undone. This means it will survive system failure, and that the database system has checked the integrity constraints and won't need to abort the transaction. Many databases implement durability by writing all transactions into a log that can be played back to recreate the system state right before a failure. A transaction can only be deemed committed after it is safely in the log.

Another common reliability measurement is to determine the (1) consistency, (2) availability, and (3) partition-tolerance of a particular distributed storage system. Put simply, consistency is the ability of all system clients to see the same stored data, even with concurrent updates. Availability is the ability for all system clients to access some version of the data. Partition tolerance is the ability for the data to be accessible when a fault causes a portion of a distributed storage system to become inaccessible.

It has been shown that a distributed storage system can only achieve two of the three properties simultaneously. For example when it is critical for all clients to see a consistent view of data stored in a database of a distributed storage system, the users of one node will have to wait for any other nodes to come into agreement before being able to read or write to the database. In this instance it can be seen that consistency is dominant over availability.

Internet applications tend to stress availability rather than consistency. If the availability of a distributed storage system is a priority then clients can be allowed to write data to one node of the distributed system without waiting for other nodes to come into agreement. If the database knows how to take care of reconciling these operations between nodes, then a sort of "eventual consistency" can be achieved in exchange for high-availability.

Another operational parameter that can be used to determine a distributed storage system's reliability is to measure the system's performability. Performability is a measurement of how often a system operates above a selected performance level. For example, a distributed storage system is designed to record blocks of data. A block of data may be a database entry, a digital picture file, or the like. A data block is recorded when a "put request" is received by the system. That block of data may then be accessed by a user through a "get request". A distributed storage system can be designed that processes at least 1000 put requests per second 90% of the time and at least 500 put requests per second 99% of the time.

Performability allows different operational parameters to be associated with the overall distributed storage system operating at different respective levels of performance. A fault-tolerant system that is capable of operating at less than full health can offer different levels of performance, at different times, depending on the system's health. Performability also captures the notion that the system may be considered unavailable, or to have failed, if a certain minimum level of performance is not achieved.

In accordance with one embodiment of the present invention, a measurement of a distributed storage system's consistency over a range of the system's performance levels is referred to herein as consistability. Consistability can be defined for a single object, wherein the object is a data file of a selected size (a data block) that is stored on a distributed storage system. Consistability will be described in three steps. First, consistency classes and failure scenarios for a selected distributed storage system are described. This will be followed by a description of how to map failure scenarios to consistency classes. Finally, there will be a description of how to calculate consistability given this mapping.

There are several different classes of consistency. These include, but are not limited to, atomic consistency, k-atomic consistency, causal consistency, regular consistency, safe consistency, and eventual consistency. This list is not intended to be inclusive. Other types of consistency are also known and are considered to be within the scope of the present invention.

Atomic consistency, also called linearizability, is the strongest consistency criterion. Under atomic consistency, a read returns the value written by the last preceding write, wherein last refers to a real-time occurrence order. Atomic registers in a distributed storage system guarantee that all reads and writes to a single object can be ordered, in a manner consistent with their relative orderings, such that reads always return the value of the latest completed write.

Causal consistency is a weaker criterion stating that a read does not get an overwritten value. Causal consistency allows concurrent writes. Consequently, it is possible that concurrent read operations on the same object will result in different values. This occurs when those values have been produced by concurrent writes. Regular consistency allows a read operation that is concurrent to write operations to return the value from any concurrent write, or the previously completed write. Safe consistency allows a read operation concurrent to write operations to return any value.

There are also many forms of weak and eventual consistency. In K-atomic consistency, also referred to as K-atomicity, the number of distinct recently completed writes that may be returned by a read operation is bound. In systems that operate with eventual consistency, a write operation may return before its value propagates throughout the system. In such systems, once all transient failures have been resolved, and no further writes are issued, replicas can converge to a consistent state.

Many types of distributed storage systems can be designed to provide predetermined levels of consistency under different failure scenarios. For example, a system may provide atomic consistency when the entire system is functioning properly. However, when there is a network partition, the same system may only be designed to provide eventual consistency. The system's consistability may be described as offering atomic consistency 90% of the time and eventual consistency within a specified time period (such as 2 hours) 99.9% of the time.

In addition, the consistability measurement can be used to distinguish between a system's worst case consistency measurements and consistency measurements obtained at other performance levels. For example, system A may provide atomic consistency 90% of the time and eventual consistency 99.99% of the time. System B may provide atomic consistency 85% of the time and eventual consistency 99.99% of the time. System A is clearly better than system B. However, consistency definitions typically provide worst-case guarantees. Such guarantees fail to capture the possibility that during failure-free periods the system can provide stronger guarantees. Beyond this, the normal language of consistency does not allow system vendors and service providers to describe the fact that a system may achieve better consistency than the worst-case guarantee.

If only the worst-case consistency measurement is compared in the above example, system A and system B appear equal. Many distributed storage systems currently in use only designate the worst-case statistics. This can make it difficult for a client to purchase or lease an appropriate system. The use of worst-case statistics can also make it difficult for a vendor or service provider to sell a system to a client that is adequate for the client's needs.

A consistability metric can provide a more robust means for evaluating and comparing distributed systems, enabling the consistency of systems to be compared, not just in the worst-case scenarios, but also in situations in which the systems are operating at full capacity, or near full capacity. While most systems are not designed to operate near 100% of their capacity all of the time, the ability to understand the system's consistency at these operational levels affords clients, vendors, and service providers with the ability to provide the information needed about different systems to allow clients to select an optimal system for their needs.

To define consistability, all of the possible consistency classes achievable can be enumerated. Let C be the set of all consistency classes the system can provide. A consistency class is a definition of a form of consistency. For example, different consistency classes may be atomic consistency, regular consistency, and eventual consistency.

The consistency classes in C can be partially ordered. For example, atomic consistency is stronger than regular consistency. K-atomic consistency is weaker than atomic consistency, but K-atomic consistency and regular consistency are not comparable. FIG. 1 provides an illustrative example of a lattice of consistency classes that includes the traditional register of consistency classes, the recent K-variants of those classes, and some eventual consistency guarantees based on time in seconds. In this example lattice, none of the consistency classes for traditional and K registers are comparable with any of the consistency classes for eventual guarantees. Comparable classes are denoted by the arrow connecting the classes.

The consistency classes can be mapped to possible failure scenarios of a particular distributed storage system. The set of all possible failure scenarios can be defined as the variable F. A failure scenario is a description of a specific failure pattern. Failure scenarios are, by definition, disjoint. Examples of failure scenarios include "no failures," "all failures of a single server and no other failures," "a network partition and no other failures," and "all failures of a single server and a network partition." This list is not intended to be inclusive. A wide variety of other types of failure scenarios can be included, as can be appreciated.

To calculate consistability, every failure scenario can be mapped to some subset of all the consistency classes. This is denoted mathematically as:

$$\chi: F \to 2^C \qquad (1)$$

Given a failure scenario, f, the mapping, $\chi(f)$, indicates the set of consistency classes achievable by the system in f. If the system provides no service in a failure scenario f, then $\chi(f)=\emptyset$. The empty set, $\emptyset$, corresponds to either unavailability or inconsistency. The mapping $\chi(f)$ may map f to consistency classes that are not comparable. For example, a system may provide both 2-Regular consistency and 60s-Eventual consistency for some failure scenario. This mapping is an example of combinatorial fault tolerance modeling: it maps all possible failures of interest to system behaviors.

A consistency class c is considered maximal for a failure scenario f if there is no consistency class in $\chi(f)$ that is stronger than c. Based on the partial order among the consistency classes, the mapping can be defined from failure scenarios to the set of maximal consistency classes that are achievable. For such an alternative mapping, if there is a total order among all consistency classes in C then each failure scenario can map to exactly one (maximal) consistency class.

Consistability is the expected portion of time that a system provides each consistency class. To provide an expectation, like reliability and performability metrics do, probability distributions over the failure scenarios are needed. FProb(f) can denote the probability that the system is in a given failure scenario. The probability of providing a consistency class CProb(c), by summing the probabilities of each failure class which maps to the consistency class is denoted:

$$\forall c \in C, CProb(c) = \sum_{f \in F} \begin{cases} FProb(f) & \text{if } c \in \chi(f) \\ 0 & \text{otherwise.} \end{cases} \qquad (2)$$

Because failure scenarios are disjoint, $\Sigma_{f \in F} FProb(f)=1$. However, $\Sigma_{c \in C} CProb(c) \geq 1$. This is because the mapping from a failure scenario to a consistency class can be one-to-many.

Equation (2) can be simplified, with Pr(f) used to denote the probability that the system is in a given failure scenario. The probability of achieving any consistency level, c, is shown as follows:

$$\text{Probability}(c) = \sum_{f \in F: c \in c(f)} Pr(f) \qquad (3)$$

There is no need to include every possible consistency class in C. In one embodiment, the consistency classes that can be included in C are (1) the consistency classes that a client may care about; (2) the consistency classes that an application can effectively use; or (3) the consistency classes that a system may actually provide. Obviously, useful consistency class can be included as desired.

Once C is decided, the system designer can define a single appropriate failure scenario for each consistency class. In one embodiment, determining the appropriate members of C and F can be an iterative process. To account for correlated failures, failure scenarios can be defined that include many different failures and the probability distribution over failure scenarios can capture this correlation.

The practice of mapping failure scenarios to consistency classes can help distributed storage system designers better understand all of the capabilities of their distributed systems and protocols.

Figure 2:
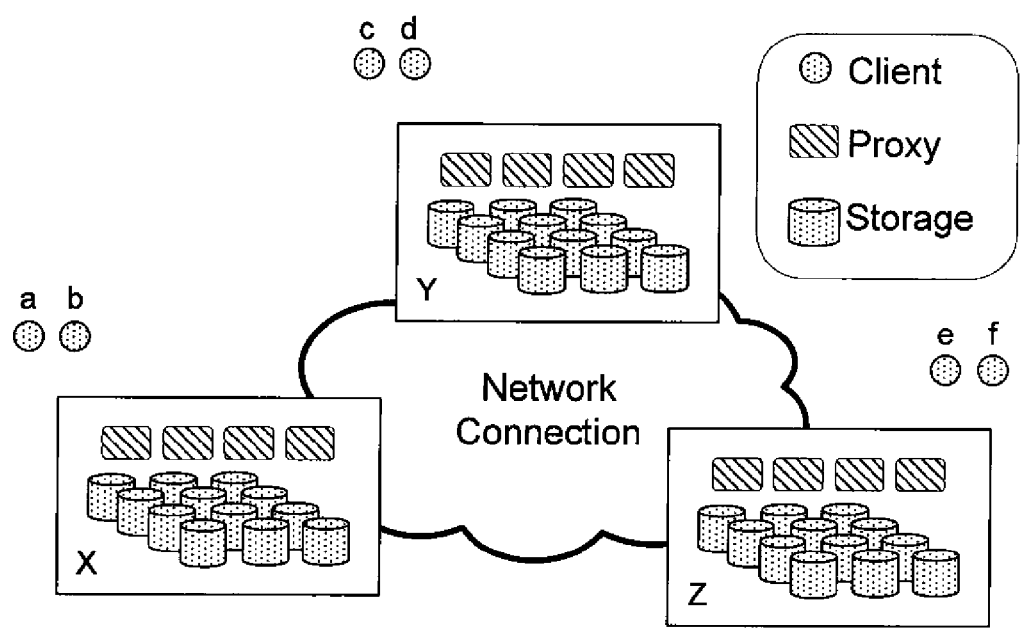
FIG. 2 is an exemplary system model for a distributed storage network in accordance with an embodiment of the present invention.

FIG. 2 an exemplary system model for a distributed storage network. Three data centers are shown (X, Y, Z) with their respective storage and proxy servers. Six clients (a to f) are also shown. In one embodiment, the clients typically access the system through their closest proxy.

For the sake of simplicity, the distributed storage network can allow get and put operations during a network partition and handle reconciliations when the network reconnects. A reconciliation rule merges put operations from distinct network partitions. An example of a reconciliation rule is to order put values from distinct network partitions by timestamp. In this example, design decisions concerning meta-data are ignored. For example, it is not discussed how clients determine which storage nodes host fragments for some key. However, it is disclosed whether metadata service is available or not.

To cost-effectively achieve reliability within the distributed storage network, values can be erasure-coded across multiple data centers in such a manner so that each data center has sufficient erasure-coded fragments to recover the value. The put operation can offer best effort consistency and disaster-tolerance. Best effort consistency is typically the highest level of consistency available. Once the metadata service selects the storage nodes for a particular operation, that operation will not complete until it has written to or timed out all of the selected nodes. The get operation offers best effort availability. If the get operation cannot retrieve the latest version of the value put into the system, it attempts to retrieve prior versions until a value is returned (or all prior versions have been tired). There is a clear tension between the reliability and disaster-tolerance requirements. Roughly speaking, a protocol can be used that is usually consistent, and only degrades to worst-case consistency when specific failures occur.

In one example, n erasure-coded data fragments can be generated by splitting an object into k data fragments and generating an additional m=n−k redundant fragments such that any k fragments are sufficient to recover the original object. To achieve data-center disaster-tolerance, at least k fragments must be available after any data center failure. For example, with k=4, and n=6, data-center disaster-tolerance can be achieved by storing two fragments at each of the X, Y, Z data centers since losing any data center leaves 4 fragments available.

For the exemplary distributed storage system illustrated in FIG. 2, the following failure scenarios are considered: (1) there are at most m disks unavailable (and the erasure code tolerates up to m disks); (2) more than m disks are unavailable; (3) a data center has failed catastrophically; (4) the data centers are partitioned into multiple groups; and (5) the meta-data service is unavailable. For the sake of brevity, composite failures, such as failure (2) and (4) occurring at the same time, are not discussed.

Failure scenario (1) is effectively the "no failures" scenario because the erasure code tolerates up to m disk failures. Failure scenarios (1) and (3) can map to the regular consistency class. In both cases, a get operation that occurs concurrent with a put operation will return some value being put concurrently, or the most recent completed put value. For case (1), the get operation will return either the prior value or the value being put concurrently, depending on message ordering at each server. For case (3), regular consistency is achieved because each data center has sufficient erasure-coded fragments to recover a value and so the most recently put value is available after such a catastrophe.

Even though only regular consistency can be provided in these failure scenarios, there are many executions that will achieve atomicity. For example, if every client preferentially selects the same node for metadata services, then the operations will achieve atomicity. Failure scenarios (2) and (4) map to the same consistency class: K-regularity, a get returns one of the K most recent values that were put. In both scenarios, some recently put values may be lost because too few erasure coded fragments are available for get to recover them. Unfortunately, without bounding the number of new, or concurrent, put operations, K is equal to infinity. For failure scenario (4), given a bound of p incomplete put operations, and d data centers, we can set K=p·d, as each data center can be in its own partition.

Failure scenario (5) maps to the null set. In general, mapping to the null set means that the system is either unavailable or inconsistent. For failure scenario (5), the system is simply unavailable since no operations can be completed.

Probability distributions are based on the actual hardware used to construct a distributed storage system. The consistency can be calculated using the probability distributions, which can be calculated according to the hardware in use, thereby enabling the consistability of the overall system for the possible failure scenarios. For each of the failure scenarios, the distributed storage system can be mapped to an identified consistency class.

In one embodiment, a model-checker can be used to verify that the consistency class semantics are obeyed for small instances of the protocol. Hand proofs can then be used to prove that the consistency class is satisfied. For example, a model checker, such as a Temporal Logic Checker (TLC) model-checker, is accepted as a useful tool for checking specifications written in the language TLA+. Protocols can be described for a particular distributed storage system, along with some consistency classes and failure scenarios in TLA+ and then model-checked using TLC.

The success in model checking the specification can be limited by the size of the system. For the failure-free case, with a single data center, it can be verified that put and get operations are atomic. However, verifying the extended specification for multiple data centers with distributed metadata service can take too long to check all possible states.

In the exemplary embodiment above, TLC can be used to verify that failure scenarios (1) and (3) map to regularity. Hand proofing was used to prove the failure scenarios. For failure scenarios (2) and (4), hand-proofing was used to show that the protocol only provides 1-regular consistency class, unless the number of disconnected put operations are bounded. Further, hand-proofing was used to show that by using failure detectors, or by restricting the number of disconnected put operations, the distributed system protocol provides K-regularity for an appropriately chosen value of K.

It is expected that a system which transitions to a worse failure scenario immediately switches to a consistency class which maps to that failure scenario. However, it is expected that a system which transitions to a better failure scenario experiences a transition period during which increasingly more objects achieve the better consistency class.

One of the benefits of determining consistability for a distributed storage system is that clients can more precisely articulate their requirements. Consistability simply complements any performability measure (i.e., consistability is not a generalization of performability). Given models of system performance in each failure scenario and a model of the workload, a unified measure of performance, consistency, and availability can be developed.

By combining failure frequency information with the consistability achieved by a system, a client can write a service level agreement (SLA) that would allow them to articulate the value they place on achieving "more consistency, more often". Both clients and servers need to be able to verify that an SLA is being met. Ideally, a system can tell a client which consistency class it provides, and potentially, what consistency class it is currently achieving (if it is offering better than worst-case consistency). This ability is referred to as introspection.

Given the scale and complexity of current distributed storage systems, it is possible that failures can occur. Sometimes, even severe failures such as network partitioning can occur. Using a consistability metric, a service level agreement can be drafted that takes into account these possible failures. Since network partitioning is possible and it is well-known that certain guarantees are unachievable under network partitioning, the worst-case consistency scenario metric may be fairly weak. However, relying only on the worst-case scenario does not adequately describe the capability of the overall system, since network partitioning happens rarely and the customer may be willing to live with occasional weak consistency. In contrast, if the consistability metric is used, then a client can be informed that the distributed storage system will provide at least strong consistency 99.9% of the time and at least weak consistency 99.999% of the time. This equates to a system that will provide at least strong consistency for all but about 8.75 hours each year and at least weak consistency for all but about 5 minutes each year. These values may be just what a client needs. Thus, using consistability to describe the system enables the client to make an educated business decision without spending unnecessary money for a storage system that is more robust than needed.

The consistency provided by a system not only depends on failure scenarios, but also system configurations (such as how many replicas a data item has) and protocol design (such as when should a read or a write return success to the client). In these two instances, consistability can be a useful metric that can be taken into consideration when designing the system.

For example, when determining a distributed storage system's configuration, system administrators often have to determine the optimal configuration, as well as migration configurations if failure distributions change. Using consistability, the task can be carried out as follows. The client can provide a utilization function for all of the consistencies that the client is concerned with. For example, the client may determine that they want the system to provide atomic consistency 99% of the time and eventual consistency 99.99% of the time. The administrator can then determine the final utilization by taking into account the consistency achieved for each configuration under each failure scenario in the predicted failure distribution. This is useful for the administrator to determine a "best" configuration and to guide the change of configuration if need be.

The system designer or client may also apply a weighting factor to different consistency classes. For example, a client may not care as much about a particular type of atomic consistency, but may be concerned with eventual consistency. Therefore, the eventual consistency probability can be weighted to provide a more substantially contribution to the overall consistability value relative to the atomic consistency value. For example, the eventual consistency probability may be doubled to contribute more to the consistability value. Alternatively, a failure class weight may be assigned to each failure class, with the weight being proportional to an estimated probability of the distributed storage system being in the failure class. The consistency values comprising the consistability measurement may also be combined using an average, a mean, and so forth, as can be appreciated. Different types of systems can then be compared by the clients based on comparable consistency values with the same weightings for similar failure scenarios.

Consistability can also be used to determine protocol designs. It is well known that different protocols achieve different kinds of consistency, with a trade-off of messages or latency. Consistability can be useful for guiding protocol design, thereby enabling the designer to have a clearer goal what to design for. For example, if the customer does not require atomic consistency, then the protocol design can be selected accordingly.

Figure 3:
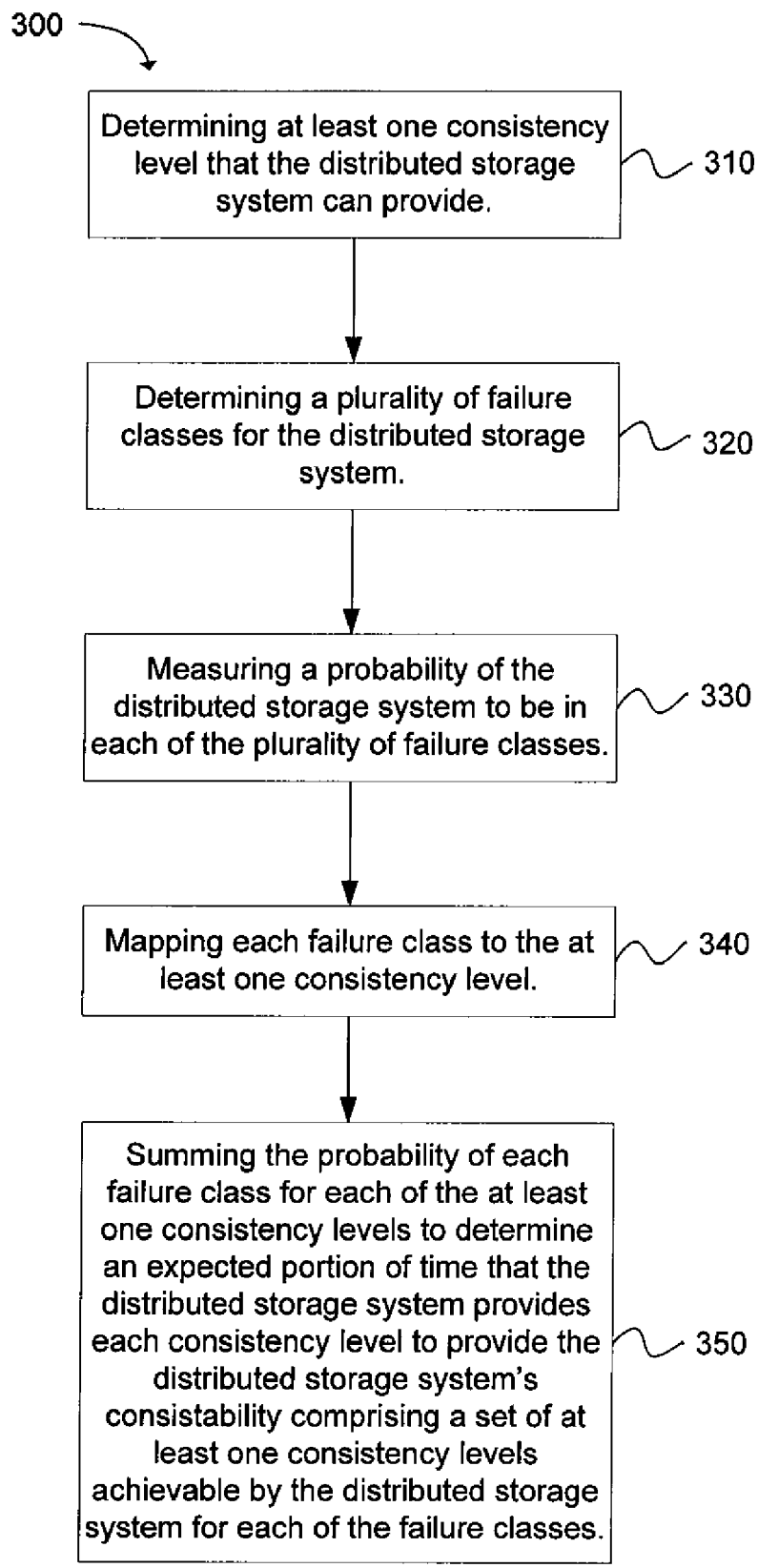
FIG. 3 is a flow chart depicting a method for measuring a distributed storage system's consistability in accordance with an embodiment of the present invention.

One embodiment of the present invention provides a method 300 for measuring a distributed storage system's consistability, as depicted in the flow chart of FIG. 3. The method includes the operation of determining 310 at least one consistency level that the distributed storage system can provide. For example, two consistency levels may be determined as atomic consistency and eventual consistency, as previously discussed. Alternatively, the system may operate using only a single consistency level, such as eventual consistency.

The method 300 includes an additional operation of calculating 320 a plurality of failure classes for the distributed storage system. The failure classes can be determined based on the physical makeup of the distributed storage system. An additional operation provides for estimating 330 a probability of the distributed storage system to be in each of the plurality of failure classes. The probability can be based on the system's design and components. The probability may be measured based on the system's components or estimated based on a knowledge of previous systems failure rates. Each failure class can be mapped 340 to the at least one consistency levels. The probability of each failure class can then be summed 350 for each consistency level to determine an expected portion of time that the distributed storage system provides each consistency level. The summed probability provides the distributed storage system's consistability comprising a set of consistency levels achievable by the distributed storage system for each of the failure classes. For example, based on the hardware and software of the system illustrated in FIG. 2, the consistability for the system may described as offering atomic consistency 90% of the time and eventual consistency within a specified time period (such as 60 seconds) 99.99% of the time.

Another embodiment of the present invention is an article of manufacture including a computer usable medium having computer readable program code embodied therein for measuring the distributed storage system's consistability. The embodiment comprises computer readable program code capable of performing the operations illustrated in the flow chart of FIG. 3. The computer usable medium can be a physical medium capable of storing the computer readable program code, such as rotatable magnetic or optical storage, solid state storage, and the like.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for measuring consistability of a distributed storage system, comprising:
   determining a plurality of consistency levels that the distributed storage system can provide;
   determining a plurality of failure classes for the distributed storage system;
   estimating a probability of the distributed storage system to be in each of the plurality of failure classes;
   mapping each failure class to at least one of the plurality of consistency levels;
   summing the probability of each failure class for each of the plurality of consistency levels based on the mapping; and
   determining a consistability measurement of the distributed storage system, the consistability measurement comprising an expected portion of time that the distributed storage system offers each of the plurality of consistency levels, the expected portion of time computed by summing the probability of each failure class for each of the plurality of consistency levels.

2. A method as in claim 1, wherein determining a plurality of consistency levels further comprises selecting at least some consistency levels from a group comprising atomic consistency, k-atomic consistency, causal consistency, regular consistency, safe consistency, and eventual consistency.

3. A method as in claim 2, further comprising selecting the plurality of consistency levels based upon a distributed system configuration.

4. A method as in claim 2, further comprising selecting the plurality of consistency levels based upon a client's consistency level needs for the distributed storage system.

5. A method as in claim 1, further comprising ordering the plurality of consistency levels based on a strength of each consistency level.

6. A method as in claim 1, further comprising selecting a strongest consistency level in each failure class.

7. A method as in claim 1, further comprising verifying consistency class semantics using a model-checker.

8. A method as in claim 1, further comprising drafting a service level agreement (SLA) between a service provider of the distributed storage system and a client, wherein the service level agreement requires a predetermined consistability level.

9. A method as in claim 8, further comprising configuring the distributed storage system to output a current consistency class that the system is achieving to enable the service level agreement to be verified.

10. A method for measuring consistability of a distributed storage system, comprising:
  determining a plurality of consistency levels that the distributed storage system can provide;
  determining a plurality of failure classes for the distributed storage system;
  mapping each failure class to at least one of the plurality of consistency levels; and
  determining a consistability measurement of the distributed storage system for each of the plurality of consistency levels based on the mapping.

11. A method as in claim 10, further comprising estimating a probability of the distributed storage system to be in each of the plurality of failure classes.

12. A method as in claim 11, further comprising:
  summing the probability of each failure class for each of the plurality of consistency levels; and
  determining an expected portion of time that the distributed storage system offers each consistency level to provide the consistability measurement of the distributed storage system, said consistability measurement comprising a set of at least one consistency level achievable by the distributed storage system for each of the failure classes.

13. A method as in claim 11, wherein determining a plurality of consistency levels further comprises selecting at least some consistency levels from the group comprising atomic consistency, k-atomic consistency, causal consistency, regular consistency, safe consistency, and eventual consistency.

14. A method as in claim 13, further comprising selecting the plurality of consistency levels based upon a client's consistency level needs for the distributed storage system.

15. A method as in claim 11, further comprising drafting a service level agreement (SLA) between a service provider of the distributed storage system and a client, wherein the service level agreement requires a predetermined consistability level.

16. A method as in claim 15, further comprising configuring the distributed storage system to output a current consistency level that the system is achieving to enable the service level agreement to be verified.

17. A method as in claim 10, further comprising:
  determining at least one consistency level that an additional distributed storage system can provide;
  determining a plurality of failure classes for the additional distributed storage system; and
  mapping each failure class to the at least one consistency level to provide an additional consistability measurement of the distributed storage system, said consistability measurement comprising a set of at least one consistency level achievable by the additional distributed storage system.

18. A method as in claim 17, further comprising assigning a weight to each consistency level and each failure class and comparing the consistability of the distributed storage system with the additional distributed storage system by comparing a sum of products of the consistency level weight and the failure class weight between the two systems.

19. A method as in claim 18, wherein assigning the failure class weight further comprises assigning a failure class weight that is proportional to an estimated probability of the distributed storage system being in the failure class.

20. An article of manufacture including a computer usable medium having computer readable program code embodied therein for measuring consistability of a distributed storage system, comprising computer readable program code capable of performing the operations of:
  determining a plurality of consistency levels that the distributed storage system can provide;
  determining a plurality of failure classes for the distributed storage system;
  measuring a probability of the distributed storage system to be in each of the plurality of failure classes;
  mapping each failure class to at least one of the plurality of consistency levels;
  summing the probability of each failure class for each of the plurality of consistency levels based on the mapping; and
  determining a consistability measurement of the distributed storage system, the consistability measurement comprising an expected portion of time that the distributed storage system offers each of the plurality of consistency levels, the expected portion of time computed by summing the probability of each failure class for each of the plurality of consistency levels.

* * * * *